US008959351B2

(12) United States Patent
Gorbach et al.

(10) Patent No.: US 8,959,351 B2
(45) Date of Patent: Feb. 17, 2015

(54) SECURELY FILTERING TRUST SERVICES RECORDS

(75) Inventors: Irina Gorbach, Bellevue, WA (US); Venkatesh Krishnan, Sammamish, WA (US); Andrey Shur, Redmond, WA (US); Dmitry Denisov, Bellevue, WA (US); Lars Kuhtz, Seattle, WA (US); Sumant Mehta, Seattle, WA (US); Marina Galata, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/614,988

(22) Filed: Sep. 13, 2012

(65) Prior Publication Data
US 2014/0075196 A1    Mar. 13, 2014

(51) Int. Cl.
*H04L 9/32*     (2006.01)
(52) U.S. Cl.
USPC .......................................................... 713/175
(58) Field of Classification Search
CPC ..... H04L 9/32; H04L 63/0823; H04L 9/3263; H04L 9/00; H04L 29/06863; H04L 63/12; H04L 9/3294; G06F 21/64; G06F 21/33
See application file for complete search history.

(56) References Cited

U.S. PATENT DOCUMENTS

| 3,781,472 | A  | * | 12/1973 | Goode et al. ................... 380/2 |
| 6,611,925 | B1 | * | 8/2003  | Spear ......................... 714/38.14 |
| 6,832,317 | B1 | * | 12/2004 | Strongin et al. ............. 713/182 |
| 7,571,315 | B1 | * | 8/2009  | Smith ........................... 713/158 |
| 8,312,263 | B2 | * | 11/2012 | Bell et al. ...................... 713/156 |
| 8,392,709 | B1 | * | 3/2013  | Agrawal ........................ 713/169 |
| 8,479,008 | B2 | * | 7/2013  | Lin et al. ...................... 713/178 |
| 2003/0182555 | A1 | * | 9/2003 | Labaton ........................ 713/176 |
| 2004/0128544 | A1 | * | 7/2004 | Hondo et al. ................. 713/201 |
| 2005/0044369 | A1 | * | 2/2005 | Anantharaman ............. 713/176 |
| 2006/0174124 | A1 | * | 8/2006 | Bell et al. ...................... 713/176 |
| 2006/0259762 | A1 | * | 11/2006 | Tanimoto ...................... 713/156 |
| 2007/0079126 | A1 | * | 4/2007 | Hsu et al. ...................... 713/176 |
| 2008/0289023 | A1 | * | 11/2008 | Wardrop ........................... 726/9 |
| 2009/0048953 | A1 | * | 2/2009 | Hazel et al. ..................... 705/35 |
| 2010/0125523 | A1 | * | 5/2010 | Solomon et al. ................ 705/51 |

(Continued)

OTHER PUBLICATIONS

Mei, H. et al., "A Compositional Claim-Based Component Certification Procedure," IEEE, 2004, p. 620-626.*

(Continued)

*Primary Examiner* — Michael Pyzocha
*Assistant Examiner* — Demaris Brown
(74) *Attorney, Agent, or Firm* — Nicholas Chen; Sade Fashokun; Micky Minhas

(57) ABSTRACT

Embodiments are directed to securely filtering trust services records. In one scenario, a client computer system receives at least one of the following trust services records: a trust services certificate, a principal certificate, a group certificate and a trust services policy. The client computer system performs a time validity check to validate the trust services record's timestamp, performs an integrity check to validate the integrity of the trust services record and performs a signature validity check to ensure that the entity claiming to have created the trust services record is the actual creator of the trust services record. The client computer system then, based on the time validity check, the integrity check and the signature validity check, determines that the trust services record is valid and allows a client computer system user to perform a specified task using the validated trust services record.

18 Claims, 4 Drawing Sheets

(56) References Cited

U.S. PATENT DOCUMENTS

| | | | |
|---|---|---|---|
| 2011/0071994 A1* | 3/2011 | Tabrizi | 707/705 |
| 2011/0131627 A1* | 6/2011 | Abendroth et al. | 726/1 |
| 2012/0054848 A1* | 3/2012 | Salowey et al. | 726/10 |
| 2012/0079569 A1* | 3/2012 | Mendelovich et al. | 726/5 |
| 2012/0102329 A1* | 4/2012 | Mittal et al. | 713/176 |
| 2012/0110646 A1* | 5/2012 | Ajitomi et al. | 726/4 |
| 2012/0110654 A1* | 5/2012 | Alrabady et al. | 726/10 |
| 2012/0240192 A1* | 9/2012 | Orazi et al. | 726/4 |
| 2012/0284090 A1* | 11/2012 | Marins et al. | 705/7.39 |
| 2012/0284506 A1* | 11/2012 | Kravitz et al. | 713/151 |

OTHER PUBLICATIONS

Li, Wei et al., "VegasFS a Prototype for File-Sharing Crossing Multiple Administrative Domains," IEEE, 2003, p. 224-231.*
Harding et al., "Wireless Authentication Using Remote Passwords," ACM, Mar. 2008, p. 24-29.*
Mizuno et al., "Authentication Using Multiple Communication Channels," ACM, Nov. 2005, p. 54-62.*
(ACM Snapshot).*
(IEEE Snapshot).*

* cited by examiner

SECURELY FILTERING TRUST SERVICES RECORDS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, web browsers allow users to access information such as web pages, email, videos, music and other types of data. In some cases, enterprises or other organizations may provide data on these web servers that is intended only for certain users (e.g. employees). In such cases, the employees typically log in and are authenticated before being given access to the data. In other scenarios, enterprises or other organizations may provide some or all of their data via a third party data host such as a cloud hosting company. Such cloud hosting companies may provide the organization's data and/or applications to a wide variety of authenticated and unauthenticated users.

BRIEF SUMMARY

Embodiments described herein are directed to securely filtering trust services records. In one embodiment, a client computer system receives at least one of the following trust services records: a trust services certificate, a principal certificate, a group certificate and a trust services policy. The client computer system performs a time validity check to validate the trust services record's timestamp, performs an integrity check to validate the integrity of the trust services record and performs a signature validity check to ensure that the entity claiming to have created the trust services record is the actual creator of the trust services record.

In another embodiment similar to that described above, a client computer system receives at least one of the following trust services records: a trust services certificate, a principal certificate, a group certificate and a trust services policy. The client computer system performs a time validity check to validate the trust services record's timestamp, performs an integrity check to validate the integrity of the trust services record and performs a signature validity check to ensure that the entity claiming to have created the trust services record is the actual creator of the trust services record. The client computer system then, based on the time validity check, the integrity check and the signature validity check, determines that the trust services record is valid and allows a client computer system user to perform a specified task using the validated trust services record.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
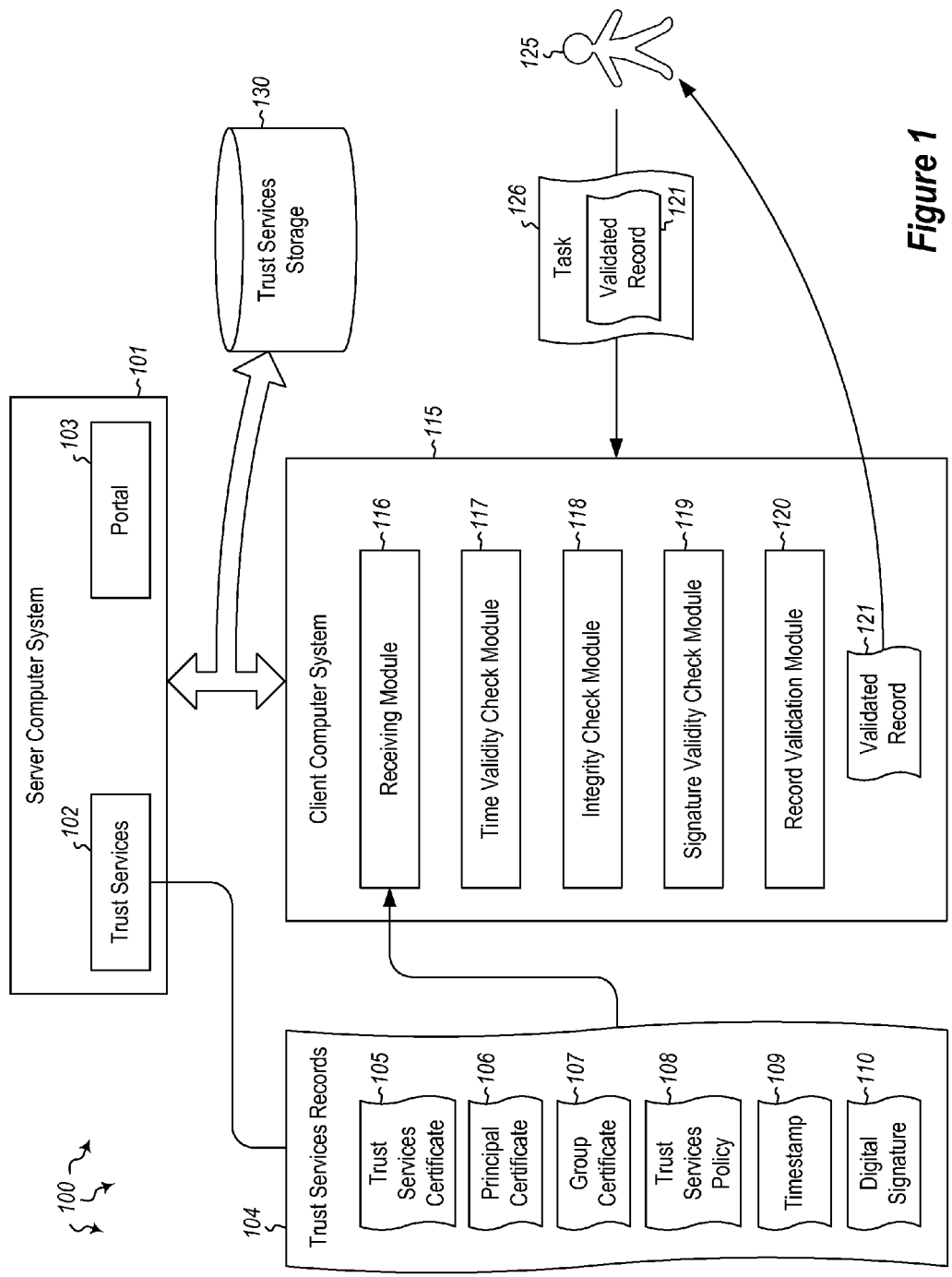
FIG. 1 illustrates a computer architecture in which embodiments described herein may operate including securely filtering trust services records.

Embodiments described herein are directed to securely filtering trust services records. In one embodiment, a client computer system receives at least one of the following trust services records: a trust services certificate, a principal certificate, a group certificate and a trust services policy. The client computer system performs a time validity check to validate the trust services record's timestamp, performs an integrity check to validate the integrity of the trust services record and performs a signature validity check to ensure that the entity claiming to have created the trust services record is the actual creator of the trust services record.

In another embodiment similar to that described above, a client computer system receives at least one of the following trust services records: a trust services certificate, a principal certificate, a group certificate and a trust services policy. The client computer system performs a time validity check to validate the trust services record's timestamp, performs an integrity check to validate the integrity of the trust services record and performs a signature validity check to ensure that the entity claiming to have created the trust services record is the actual creator of the trust services record. The client computer system then, based on the time validity check, the integrity check and the signature validity check, determines that the trust services record is valid and allows a client computer system user to perform a specified task using the validated trust services record.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes server computer system 101 and client computer system 115. Either or both of server and client computer systems 101 and 115 may be any type of local or distributed computer system, including a cloud computing system. The computer systems include various modules for performing a variety of different functions. For instance, server computer system 101 includes trust service 102 and portal 103. An administrator or other computer user may use portal 103 to control and manage the trust services A and B. The trust services allow encryption keys, certificates and data policies to be stored in a public or untrusted data store (perhaps trust services storage 130, which may be trusted or untrusted) in encrypted form, while ensuring that only authorized users can access the data. The trust services may use trust services records 104 in their communication with the client computer system 115 and/or with of other computer systems.

These trust services records 104 may include multiple different elements including a trust services certificate 105, a principal certificate 106, a group certificate 107 and a trust services policy 108. Each of these elements may have its own timestamp 109 and/or digital signature 110. These elements will be explained further below.

The client computer system 115 may include various different elements including modules 116-120. Each of these modules may represent a separate software function, or the functions may be combined into a trust services software development kit (SDK). The software modules include receiving module 116. The receiving module may receive the trust services records 104 from trust service 102. The receiving module 116 may also receive data and/or metadata from trust service 102 and/or trust services storage 130. The receiving module may pass the received trust services records to various modules including the time validity check module 117, the integrity check module 118 and/or the signature validity check module. If a record has passed each of these checks (or, in some cases, at least a certain number of them), the record validation module 120 will indicate that the record is valid and send the record 121 (as validated by module 120) to the client 125 and/or store the record internally. This validated record may then be used by the client 125 to perform a specified task 126.

In some cases, client 125 may be a business owner, or an IT operator for a business. Businesses and other organizational entities may be constrained by privacy and security concerns. In such cases, trust services (e.g. 102) may be used to allow the business to use (potentially untrusted) cloud data storage and use other cloud platform services. The trust services provide data-centric security that allows data to reside in a public cloud, while ensuring that only authorized users can access the data. The modules of the client computer system 115 allow trust services records 104 to be securely filtered to ensure that the records are valid, have not been injected by the server computer system, by another computer system or by a third party, have not been tampered with, etc. This filtering system also prevents the server computer system 101 from tricking the client into migrating data that should be encrypted, in the clear, to the cloud.

Embodiments described herein provide the ability to perform trusted filtering of trust services records on the client computer system 115. The embodiments also describe the various checks that are performed to ensure proper filtering. A trust service (e.g. 102) application programming interface (API) may be used to provide the checks including a time validity check 117, an integrity check 118 and a signature validity check 119. Each of these operations is cryptographically provable and uniquely traceable to the person who performed it. Moreover, operations performed by entities residing in or external to the cloud cannot compromise the privacy of the client's data and encryption keys. Each record in used by the trust services is digitally signed and, as such, can be traced to the creator.

When the receiving module 116 on the client computer system 115 downloads records from the trust services, the client computer system makes sure that only records signed by locally trusted certificates are decrypted and used during encryption or decryption operations. Then, if a new record is injected into the trust services by the server 101 or by a third party, the client computer system will filter the new record out based on the signature validity check 119 and trusted principals. If the server or a third party manages to somehow delete a trust services record, a client application (e.g. a software development kit (SDK)) on the client computer system will find no trusted record and raise an error, ensuring that no clear text data will be leaked.

Trusted filtering of records on the client computer system 115 protects clients (e.g. 125) from malicious servers and untrusted entities. Trusted filtering also ensures that the client does not get tricked into compromising sensitive data in the cloud (e.g. by sending sensitive data in the clear to the cloud). Any record that has been tampered with, deleted or injected into the trust services by the server or an untrusted party is filtered out and can thus be prevented from causing harm to the client computer system 115.

Trust services 102 stores non-user data in three federations: Key Federation, Policy Federation and Certificate Federation. These federations store the keys, certificates and policies that govern who is authorized to access what data and how user data is pushed to the cloud. Before clients can pull user data from the cloud and access it, they first interact with data stored in trust services (e.g. records in trust services that are relevant to the client) to check if they are authorized to access the data, and if yes, then how they can decrypt the data. Clients cannot blindly trust information in the records obtained from trust services as this information can be corrupted/misrepresented by the server or a third party. In order to introduce client trust in these records, a set of rules or policies may be established while reading data from trust services storage 130. The various checks (117-119) made by the client using a combination of these rules ensure that the client does not get tricked into accessing manipulated data.

At least in some embodiments, elements of the trust services records 104, including certificate records 105, principal certificate records 106, group certificate records 107 and policy records 108, each include a time validity check. When a client computer system downloads these records from a trust service (e.g. 102) the client computer system verifies that, for example, the expiration date on the record is not passed and that the "valid from" and "timestamp" fields on the record are in the past. One of the checks made on multiple different record types including record certificates, principal and group certificate records and policy records, is the integrity check 118. This check works by constructing a new record globally unique identifier (GUID) based on the content and metadata of the record and then comparing it with the GUID on the record obtained from the trust service. This ensures that if a record was manipulated in the cloud, its GUID would not match the one constructed from the manipulated content. This prevents the user from decrypting records that may have been tampered with.

Another check performed is the signature validity check 119. This check is performed on each of the four kinds of records mentioned above (i.e. 105-108). The client computer system 115 performs this check to ensure that the entity claiming to be the creator of the record is the actual creator. The client computer system also ensures that the record was created by one of its trusted entities. If one or more of the checks fails, the record will be filtered out and discarded. Each of these concepts will be explained further below with regard to methods 200 and 300 of FIGS. 2 and 3, respectively.

Figure 2:
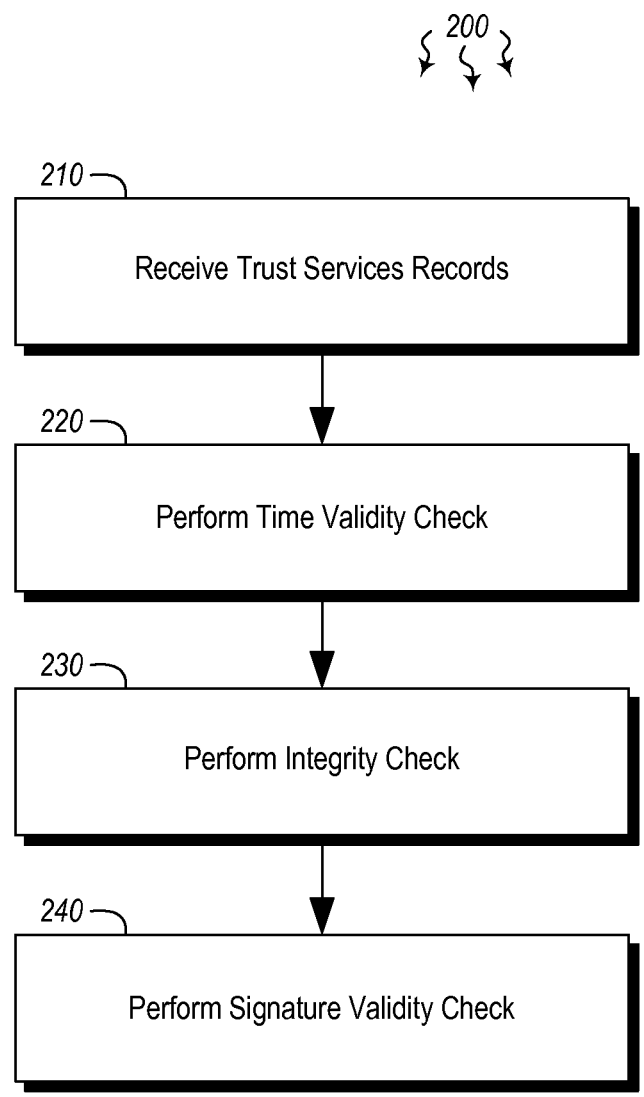
FIG. 2 illustrates a flowchart of an example method for securely filtering trust services records.
Figure 3:
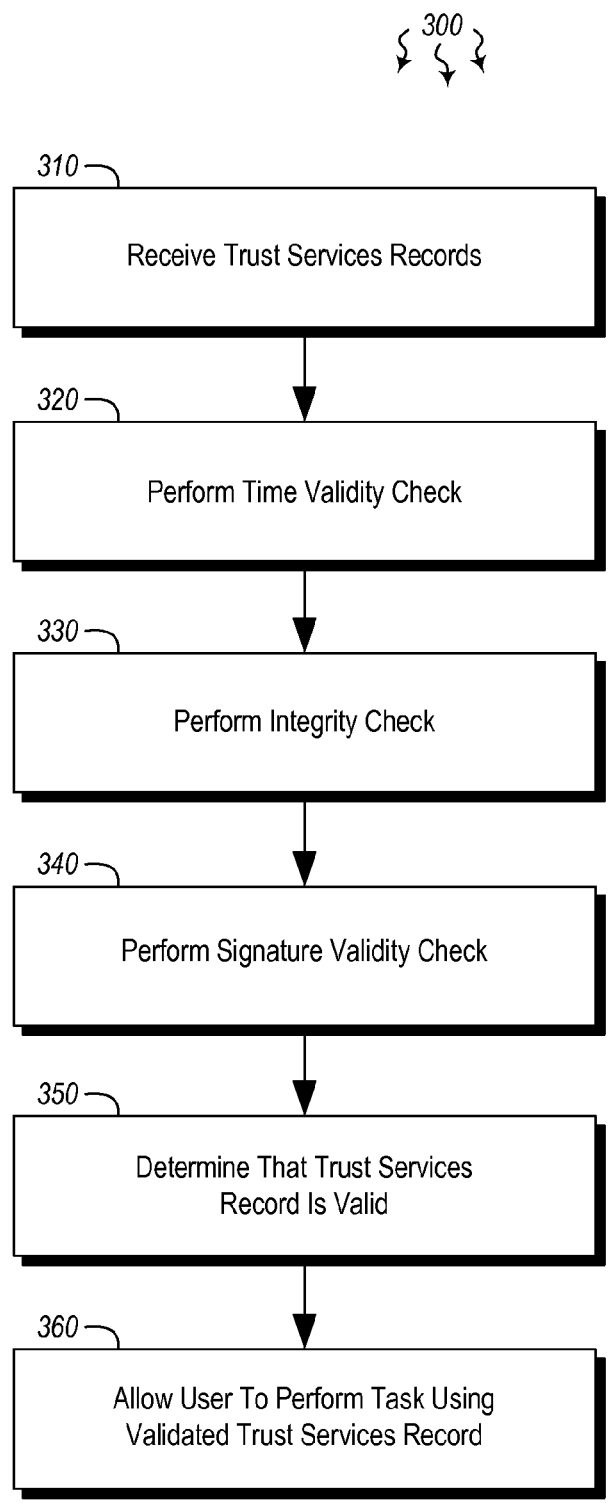
FIG. 3 illustrates a flowchart of an alternative example method for securely filtering trust services records.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for securely filtering trust services records. The method 200 will now be described with frequent reference to the components and data of environment 100.

Method 200 includes an act of the client computer system receiving at least one of the following trust services records: a trust services certificate, a principal certificate, a group certificate and a trust services policy (act 210). For example, receiving module 116 of client computer system 115 may receive trust services record 104 which includes trust services certificate 105, principal certificate 106, group certificate 107 and/or trust services policy 108. Other trust services records not mentioned may also be included within record 104. Any of the trust services records may be digitally signed by the record's creator. Thus, if an administrator signs trust services policy 108 with their digital signature 110, the policy will include the administrator's signature. This signature may be used by the signature validity check 119 to ensure that the record is from the alleged author. In such cases, the creator may provide their public key for signature verification by the client.

Method 200 also includes an act of the client computer system performing a time validity check to validate the trust services record's timestamp (act 220). Time validity check module 117 may perform the time validity check to ensure that the trust services record's timestamp is proper. Any or all of the trust services records 104 (e.g. records 105-108) may include a timestamp 109 with expiration date, a valid from field and a timestamp field. The expiration date indicates the date and time past which the record will no longer be valid. The valid from field indicates the first date and time from which the record can be valid, and the timestamp field indicates when the record was created (or last changed). The time validity check 117 includes verifying that the expiration date has not passed and/or verifying that the valid from field and timestamp fields have dates that are in the past. If the expiration date has not passed, and the valid from fields and timestamp fields are in the past, the record is valid, and may be indicated as such by the time validity check module 117.

Method 200 further includes an act of the client computer system performing an integrity check to validate the integrity of the trust services record (act 230). The integrity check module 118 of client computer system 115 may perform the integrity check. The integrity check may include constructing a record globally unique identifier (GUID) based on the trust services record's content and metadata and then comparing the record GUID with a previously generated record GUID corresponding to the same record. If the GUIDs do not match, then it can be inferred that the trust services record has been tampered with or altered in some manner. If such is the case, the record is filtered out and is discarded.

Method 200 then includes an act of the client computer system performing a signature validity check to ensure that the entity claiming to have created the trust services record is the actual creator of the trust services record (act 240). The signature validity check module 119 may perform the signature validity check that ensures that the entity claiming to have created the record is the actual creator. The signature validity check may access the digital signature 110 to ensure that the signature is the expected signature and that it corresponds to the expected author of the record. Moreover, the signature validity check may verify that the trust services record was created by a trusted entity. It should be noted that while each of these checks has been described separately, each check may be used in combination with the other checks (117-119) or with other validation checks. The checks may be used in any order and at any time during client-server communication.

FIG. 3 illustrates a flowchart of a method 300 for securely filtering trust services records. The method 300 will now be described with frequent reference to the components and data of environments 100 and 400 of FIGS. 1 and 4, respectively.

Method 300 includes an act of the client computer system receiving at least one of the following trust services records: a trust services certificate, a principal certificate, a group certificate and a trust services policy (act 310). As mentioned above, the receiving module 116 of client computer system 115 may receive trust services record 104 which includes trust services certificate 105, principal certificate 106, group certificate 107 and/or trust services policy 108. The client computer system 115 may then perform one or more checks on the trust services record 104 including a time validity check to validate the trust services record's timestamp (act 320), an integrity check to validate the integrity of the trust services record (act 330) and a signature validity check to ensure that the entity claiming to have created the trust services record is the actual creator of the trust services record (act 340). Each of these checks is cryptographically provable and uniquely traceable to the creator. As such, the checks can be performed securely, with little to no risk that an outsider could insert a counterfeit trust services record.

Method 300 also includes, based on the time validity check, the integrity check and the signature validity check, an act of determining that the trust services record is valid (act 350). For example, the record validation module 120 may determine that if trust services record 104 has passed each of the three aforementioned checks (117-119), that the record is valid. This validated trust services record 121 may then be used by a client 125 or other user to perform a specified task (act 360). The client may be a publisher who has published data to the cloud (or to another data store) or may be a subscriber who is accessing data from the cloud (or from another data store). Accordingly, the client 125 may publish data to the cloud, access data from the cloud, or perform some other specified task 126 using the validated trust services record 121.

Figure 4:
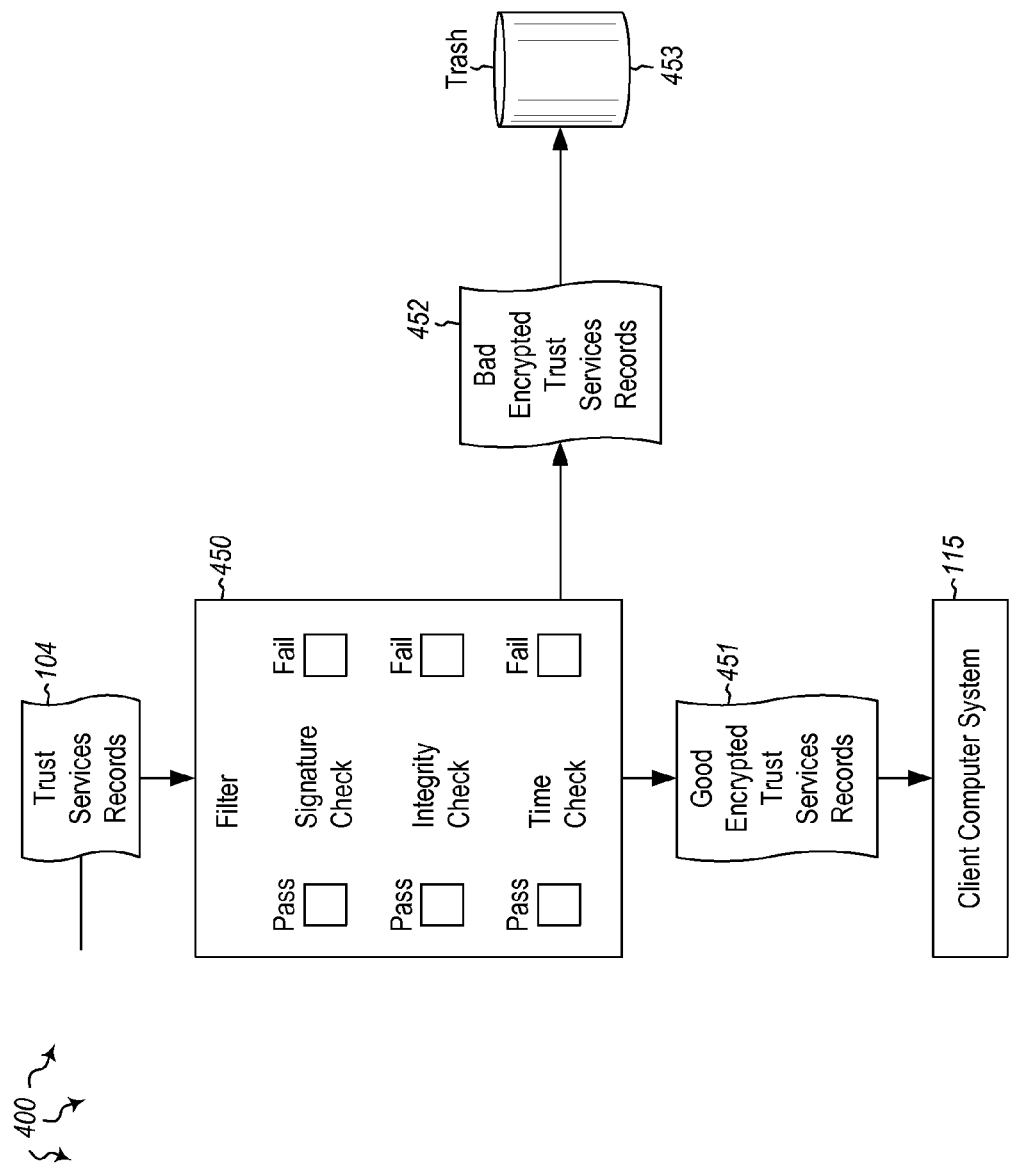
FIG. 4 illustrates an embodiment in which bad trust services records are filtered out.

As shown in FIG. 4, trust services records 104 may be filtered by filter 450 (which may be similar to or the same as record validation module 120). Each check has a "Pass" box and a "Fail" box. If one or more of the checks fails, the trust services record will be labeled as a bad record 452 and will be filtered out and discarded (e.g. deleted or sent to trash bin 453). Records that pass each of the checks will be labeled as good records 451 and will be retained by the client computer system 115. In this manner, records that have been tampered with, or are counterfeit, or are expired will be filtered out by at least one of the time validity check 117, the integrity check 118 and the signature validity check 119. If the client computer system 115 determines that a trust services record has been deleted by an entity, it will raise an error that prevents clear text data from being accessed by a third party. Thus, if the record is invalid from being altered, edited or deleted, the record will be filtered out and the user attempting to access data using the record will be prevented from doing so.

Accordingly, methods, systems and computer program products are provided which securely filter trust services records. Because trust services records allow users to access data stored on the cloud, properly filtering out altered or counterfeit trust services records prevent unauthorized users from accessing other users' data, and will allow clients to securely store data on the cloud.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory; and
one or more computer-readable storage media having stored thereon computer-executable instructions that, when executed by the one or more processors, causes the computing system to perform a method for securely filtering trust services records, the method comprising the following:
the computer system receiving information associated with a trust services record, the information comprising: a trust services certificate, a principal certificate, a group certificate, and a trust services policy;
the computer system validating the trust services record by performing at least the following checks:
a time validity check to validate one or more time fields of the trust services record;
an integrity check to validate the integrity of the trust services record, the integrity check including constructing a record unique identifier based on content of the trust services record and comparing the record unique identifier with a previously generated record unique identifier, wherein the constructed record unique identifier and the previously generated record unique identifier and are each globally unique identifiers (GUIDs), and wherein the trust services record is filtered out if the previously generated record GUID does not match the constructed record GUID; and
a signature validity check to ensure that an entity claiming to have created the trust services record is an actual creator of the trust services record;
the computer system determining whether the trust services record is valid or invalid, the trust services record being valid when each of the checks that were performed when validating pass, the trust services record being invalid when at least one of the checks that were performed when validating does not pass; and
the computer system allowing performance of a specified task using the trust services record when the trust services record is determined to be valid, or preventing the performance of the specified task using the trust services record when the trust services record is determined to be invalid.

2. The computer system of claim 1, wherein the signature validity check verifying that the entity claiming to have created the trust services record is the actual creator further verifies that the trust services record was created by a trusted entity.

3. The computer system of claim 1, wherein the trust services policy is digitally signed by an administrator.

4. The computer system of claim 3, wherein the administrator provides their public key for signature verification by the computer system.

5. The computer system of claim 1, wherein the computer system is at least one of a publisher and a subscriber.

6. One or more computer-readable storage devices having stored thereon computer-executable instructions that, when executed by one or more processors, causes a computing system to perform a method for securely filtering trust services files, the method comprising the following:
the computer system receiving information associated with a trust services record,
the information comprising: a trust services certificate, a principal certificate, a group certificate, and a trust services policy;
the computer system validating the trust services record by performing at least the following checks:
a time validity check to validate one or more time fields of the trust services record;
an integrity check to validate the integrity of the trust services record, the integrity check including constructing a record unique identifier based on content of the trust services record and comparing the record unique identifier with a previously generated record unique identifier, wherein the constructed record unique identifier and the previously generated record unique identifier and are each globally unique identifiers (GUIDs), and wherein the trust services record is filtered out if the previously generated record GUID does not match the constructed record GUID; and
a signature validity check to ensure that an entity claiming to have created the trust services record is an actual creator of the trust services record;
the computer system determining whether the trust services record is valid or invalid, the trust services record being valid when each of the checks that were performed when validating pass, the trust services record being invalid when at least one of the checks that were performed when validating does not pass; and
the computer system allowing performance of a specified task using the trust services record when the trust services record is determined to be valid, or preventing the performance of the specified task using the trust services record when the trust services record is determined to be invalid.

7. The one or more computer-readable storage devices of claim 6, wherein the time validity check, the integrity check and the signature validity check are each cryptographically provable and uniquely traceable.

8. The one or more computer-readable storage devices of claim 6, wherein tampered records are filtered out by at least one of the time validity check, the integrity check and the signature validity check.

9. The one or more computer-readable storage devices of claim 6, wherein records injected by another entity or by a third party are filtered out by at least one of the time validity check, the integrity check and the signature validity check.

10. The one or more computer-readable storage devices of claim 6, wherein the trust services policy is digitally signed by an administrator who provides a public key for signature verification by the computer system.

11. A method, implemented at a computer system that includes one or more processors, for securely filtering trust services files, the method comprising:
- receiving, by the computer system, information associated with a trust services record, the information comprising: a trust services certificate, a principal certificate, a group certificate, and a trust services policy;
- validating, by the computer system, the trust services record by performing at least the following checks:
- a time validity check to validate one or more time fields of the trust services record;
- an integrity check to validate the integrity of the trust services record, the integrity check including constructing a record unique identifier based on content of the trust services record and comparing the record unique identifier with a previously generated record unique identifier, wherein the constructed record unique identifier and the previously generated record unique identifier and are each globally unique identifiers (GUIDs), and wherein the trust services record is filtered out if the previously generated record GUID does not match the constructed record GUID; and
- a signature validity check to ensure that an entity claiming to have created the trust services record is an actual creator of the trust services record;
- determining, by the computer system, whether the trust services record is valid or invalid, the trust services record being valid when each of the checks that were performed when validating pass, the trust services record being invalid when at least one of the checks that were performed when validating does not pass; and
- allowing, by the computer system, performance of a specified task using the trust services record when the trust services record is determined to be valid, or preventing the performance of the specified task using the trust services record when the trust services record is determined to be invalid.

12. The method of claim 11, further comprising upon determining that a record has been deleted by an entity, raising an error.

13. The method of claim 12, wherein raising the error prevents clear text data from being accessed by a third party.

14. The computer system of claim 1, wherein the trust services record also includes a digital signature.

15. The computer system of claim 14, wherein performing the signature validity check to ensure that the entity claiming to have created the trust services record is the actual creator of the trust services record comprises performing the signature validity check on the digital signature.

16. The computer system of claim 1, wherein performing the time validity check to validate one or more time fields of the trust services record comprises performing the time validity check to validate each of an expiration date, a valid from field, and a timestamp of the trust services record.

17. The computer system of claim 16, wherein the expiration date indicates a date and time past which the trust services record is no longer valid, the valid from field indicates a first date and time from which the trust services record can be valid, and the timestamp field indicates when the trust services record was created or last changed.

18. The computer system of claim 16, wherein performing the time validity check to validate each of the expiration date, the valid from field, and the timestamp of the trust services record includes verifying each of:
- whether the expiration date has passed, the time validity check failing when the expiration date has passed;
- whether the valid from field has a date and time that is in the past, the time validity check failing when the valid from field has not passed; and
- whether the timestamp field has a date and time that is in the past, the time validity check failing when the timestamp field has not passed.

* * * * *